United States Patent
Oyekan et al.

(10) Patent No.: US 8,778,823 B1
(45) Date of Patent: Jul. 15, 2014

(54) FEED ADDITIVES FOR CCR REFORMING

(71) Applicant: Marathon Petroleum Company LP, Findlay, OH (US)

(72) Inventors: Soni O. Oyekan, LaPlace, LA (US); Kenneth D. Rhodes, Wayne, WV (US); Nicholas K. Newlon, Huntington, WV (US)

(73) Assignee: Marathon Petroleum Company LP, Findlay, OH (US)

( * ) Notice: Subject to any disclaimer, the term of this patent is extended or adjusted under 35 U.S.C. 154(b) by 57 days.

(21) Appl. No.: 13/682,145

(22) Filed: Nov. 20, 2012

Related U.S. Application Data

(60) Provisional application No. 61/562,073, filed on Nov. 21, 2011.

(51) Int. Cl.
 *B01J 38/44* (2006.01)
(52) U.S. Cl.
 USPC .............................. 502/37; 502/38; 502/518
(58) Field of Classification Search
 USPC .................. 502/37, 38, 35, 514, 515, 518
 See application file for complete search history.

(56) References Cited

U.S. PATENT DOCUMENTS

| | | | |
|---|---|---|---|
| 4,332,671 | A | 6/1982 | Boyer |
| 5,045,177 | A | 9/1991 | Cooper et al. |
| 5,053,371 | A | 10/1991 | Williamson |
| 5,885,439 | A | 3/1999 | Glover |
| 5,935,415 | A | 8/1999 | Haizmann et al. |
| 7,419,583 | B2 | 9/2008 | Nieskens et al. |
| 7,637,970 | B1 | 12/2009 | Fox et al. |
| 7,988,753 | B1 | 8/2011 | Fox et al. |
| 2011/0147267 | A1 | 6/2011 | Kaul et al. |

*Primary Examiner* — Edward Johnson
(74) *Attorney, Agent, or Firm* — Emch, Schaffer, Schaub & Porcello Co., L.P.A.

(57) ABSTRACT

The process involves the use of specifically selected coke precursor compounds from the front end of oil distillate fractions that contain C11 to C14 hydrocarbons and their use as additives in the processing of naphtha in a catalytic reformer. The C11 to C14 compounds additives enhance coke make in continuous catalytic regeneration (CCR) reformers to levels higher than those which are usually produced in low coke naphtha reforming operations. With the increase of ethanol blending in gasoline and low reformate octane severity operations, reformers do not produce the necessary amount of coke to permit sustaining steady state white burn operations.

9 Claims, 1 Drawing Sheet

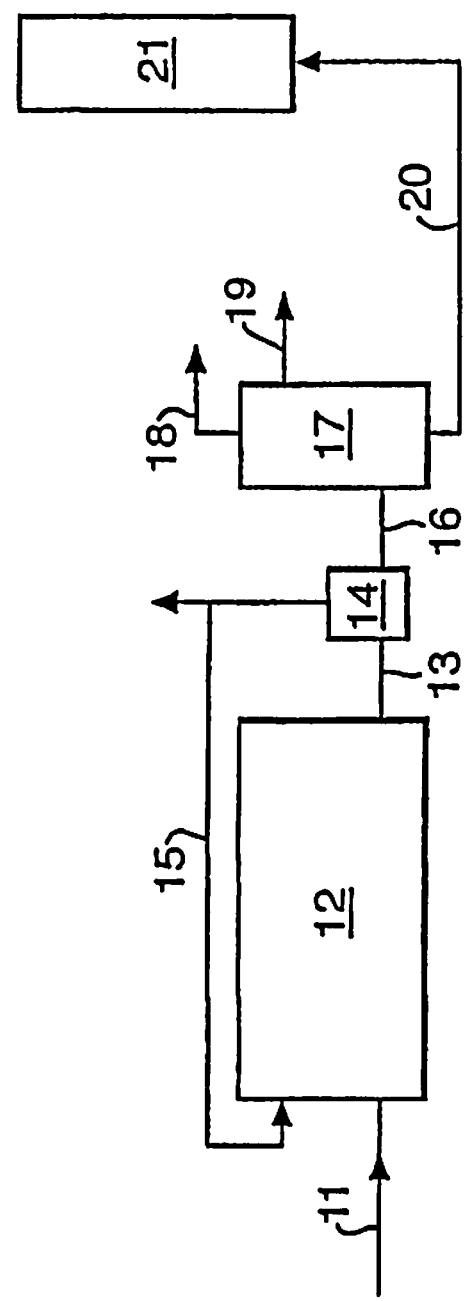

FEED ADDITIVES FOR CCR REFORMING

CROSS REFERENCE TO RELATED APPLICATION

This application is a conversion of and claims the benefit of U.S. provisional patent application Ser. No. 61/562,073 filed Nov. 21, 2011.

FIELD OF THE INVENTION

The present invention relates to a continuous catalyst regeneration (CCR) reformer system using hydrocarbon additives.

BACKGROUND OF THE INVENTION

Catalytic processes for the conversion of hydrocarbons using platinum group metals and a catalyst support are well known and extensively used. One such process is catalytic reforming of naphtha wherein the naphtha is co-processed with hydrogen over platinum containing reforming catalysts. During naphtha reforming, the catalysts used in these processes become deactivated. Often the accumulation of coke deposits causes the deactivation. Reconditioning of the catalyst to remove coke deposits is necessary to restore the activity of the catalyst. Coke is normally removed from catalyst by contact of the coke containing catalyst at high temperature with an oxygen-containing gas to combust and convert coke to essentially carbon dioxide and water in a regeneration process. Equipment and technology for continuously or semi-continuously removing catalyst particles from a reaction zone and for coke removal in a regeneration zone are well known.

In order to combust coke in a typical regeneration zone, a regeneration gas is continuously circulated to the burn zone of a regeneration section and a flue gas containing by-products of coke combustion, oxygen and water is continually withdrawn. Coke combustion is controlled by using low oxygen concentration regeneration gas to contact the coke-containing catalyst particles. The regeneration gas is continuously circulated through the catalyst particles in a recycle gas loop. A small stream of combustion gas is added to the regeneration so as to replace oxygen consumed in the combustion of coke and a small amount of flue gas is vented off to allow for the addition of the combustion gas. The steady addition of combustion gas and the venting of flue gas establish steady state condition that produces a nearly constant concentration of water and oxygen in the regeneration gas.

After the burn zone, the metal-containing catalyst particles drop to a halogenation zone. Chlorine or other halogen-containing gas circulates through the halogenation zone in a halogenation loop. Contacting the catalyst with the haolgenation gas redisperses platinum group metals on the catalyst particles. In addition, some of the added halogen replaces lost halogen from the catalyst during naphtha processing. The halogen gas added to the halogenation loop sometimes enters the loop in admixture with air or other oxygen-containing gas. The process in the halogenation zone enables re-dispersion of the platinum group metals on the catalyst and it is referred to as white burn when used after the regenerator burn zone described previously From the halogenation zone catalyst particles descend into a drying zone. A heated gas contacts the catalyst particles and drives moisture from the catalyst. Typically, air or an oxygen-containing gas enters the drying zone as the drying medium and passes upward through the halogenation zone to the burn zone to provide combustion gas.

The three different zones provide three potential places for the introduction of air or an oxygen-containing gas into the regeneration system. These three locations are often referred to as upper, middle and lower air and correspond to the relative positions of the upper burn zone, middle halogenation zone, and lower drying zone. When coke on the spent catalyst is low, the regenerator is not used and catalyst is not usually circulated. The performance of the catalyst in the reactors decline with time as re-activated catalyst particles are not continuously introduced to replace spent catalyst. Long term continuous operation of the reformer in this mode without the use of the regenerator leads to inefficient and uneconomical naphtha reforming.

SUMMARY OF THE INVENTION

The invention involves the use of specifically selected coke precursor compounds from the front end of oil distillate fractions that preferably contain C11 to C16 hydrocarbons and their use as additives in the processing of naphtha in a catalytic reformer. The C11 to C16 compounds additives enhance coke make in continuous catalyst regeneration (CCR) reformers to levels higher than those which are usually produced in low coke naphtha reforming operations. With the increase of ethanol blending in gasoline and low reformate octane severity operations, reformers do not produce the necessary amount of coke to permit sustaining steady state white burn operations required for maintaining platformer productivity and profitability. The use of this invention permits operating performers more productively and profitably by adding appropriately selected coke precursor compounds to permit generating sufficient catalyst coke for steady state continuous regenerator operations required for optimal re-activation of the catalyst.

Other objects and advantages of the present invention will become apparent to those skilled in the art upon a review of the following detailed description of the preferred embodiments and the accompanying drawings.

IN THE DRAWINGS

FIG. 1 shows a conventional CCR reforming unit.

DETAILED DESCRIPTION OF THE INVENTION

FIG. 1 shows a conventional CCR reforming unit. Feedstock is introduced via line 11 in CCR reforming unit 12. The effluent of reforming unit 12 is led via line 13 to separator 14. A hydrogen-rich gaseous stream is then separated from the effluent and partly recycled to reforming unit 12 via line 15. Further, the hydrocarbon stream is fed via line 16 to stabilizer 17. In stabilizer 17, the hydrocarbon stream is fractionated into fuel gas, a C4-hydrocarbons stream, and a C5+ reformate. The fuel gas is withdrawn via line 18, the C4-hydrocarbons stream via line 19. Reformate is sent to gasoline pool 21 via line 20.

Continuous catalyst regeneration (CCR) reformers operate efficiently by ensuring that spent catalyst coke is removed continuously and re-conditioned via coke burns in the regenerator followed by re-activation of platinum and promoter metals in the Chlorination and metal reduction zones. The use of the Chlorination zones for metals re-dispersion can only occur when air and organic chloride are introduced into the Chlorination zones during what is generally referred to as white burn as described previously in the background of invention section. When nitrogen is used in the Chlorination zones instead of air and coke burns are conducted only in the burn zones of regenerators, the metals on catalyst particles are agglomerated due to the hydrothermal conditions in the burn zone of the regenerators. This mode of incomplete activation of the spent catalyst involving only the coke burn and no platinum and promoter metals re-dispersion is referred to as black burn. During low octane naphtha operations in the reactors, low catalyst coke of less than 2.0 wt. % are produced and as such regenerator operations have to be discontinued and regenerators put on hold due to low spent catalyst coke. The regenerator outages are necessary due to unstable coke burns to protect equipment around the regenerator such as the air heater, the Disengaging Hopper and regenerator screens. Regenerators are sometimes used intermittently and this mode of operating the regenerators leads to poor reformer operations and low reformate and hydrogen yields due to some fraction of agglomerated catalyst particles in the reactor section. This invention permits generating sufficient catalyst coke in the reactors so as to permit steady state white burn operations of the regenerator and ensure continuous reactivation of the catalyst.

Current operations of CCR platformers or reformers are at low platformate octane severities due to increased ethanol blending in gasoline with up to 15% ethanol in the gasoline. CCR platformers that were designed to operate with highly paraffinic naphtha and at high reformate octane severities now operate at such low reformate octane severities that spent catalyst coke have dropped to less than 50% of the design coke production. As a consequence, regenerators designed to maintain optimal activity of reforming catalysts are often not used. Concerns with respect to unstable coke combustion in the regenerators and possible damage to equipment such as the air heater, disengaging hopper and regenerator screens lead to non use of the regenerators. Consequences of the regenerator outages and sporadic use of the regenerators are inactive catalyst, poor reformer productivity and profitability. In order to enhance reformer productivity during low reformate octane severity operations; we add a measured amount of C11 to C16 hydrocarbons to permit maintaining sufficient catalyst coke for use of steady state white burn regenerator operations.

The specific selection of the appropriate range of hydrocarbons and the amount of the hydrocarbons used are critical for producing platformate or reformate that can be blended with other appropriate refinery gasoline component streams to produce specification gasoline with respect to the gasoline end point and drivability index. In addition, the amount of coke precursor compounds should be such as to produce spent catalyst carbon of about 3.5 to 7.0 wt. % to ensure steady state white burn operations. For black burn operations the spent catalyst coke could be in the range of 7.0 to 20.0 wt. %. The invention, therefore covers, both black and white burn operations and it is primarily aimed at sustaining white burn steady state operations to derive full benefits in CCR naphtha reforming processes.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A method of operating a continuous regeneration system for a reforming process, wherein a regeneration section includes a burn zone, a halogenation zone, and a drying zone in serial progression, comprising:
    (a) transfer of catalyst particles containing a platinum group metal and having coke deposited thereon to the burn zone and contacting the catalyst particles with hydrocarbon gases to combust coke from the particles;
    (b) continuously circulating the gas from a flue gas outlet to a recycle gas inlet in a recycle gas loop, venting a vent gas comprising combustion products from said recycle loop, and adding a combustion gas comprising hydrocarbon gases to the recycle gas loop in substantially equal mass flow to amount of vent gas leaving the recycle loop;
    (c) passing catalyst particles from the burn zone to halogenation zone and contacting said catalyst particles with a halogen-containing gas in said halogenation zone and redispersing the platinum group metal on said catalyst;
    (d) continuously circulating the halogen-containing gas from a halogenation gas outlet to a halogenation gas inlet in a halogenation loop and adding a halogen to said halogenation gas loop in an amount determined to maintain a halogen concentration in the halogenation loop;
    (e) passing catalyst particles from the halogenation zone to a drying zone and contacting the catalyst particles with drying gas in the drying zone;
    (f) passing said oxygen-containing-containing drying gas to a lower portion of said drying zone;
    (g) passing at least a portion of said oxygen-containing drying gas upwardly from said drying zone through said halogenation zone in admixture with said halogenation gas to provide, in part, combustion gas for the burn zone; and
    (h) passing at least a portion of the halogenation gas into the burn zone to provide, in part, combustion gas for the burn zone.

2. The method of claim 1 wherein said catalyst comprises a platinum group metal on an alumina support and halogen component.

3. The method of claim 2 wherein said platinum group metal comprises platinum.

4. The method of claim 1 wherein the burn zone, halogenation zone, and drying zone are in a stacked arrangement with the burn zone on top and the catalyst progresses through said beds under gravity flow.

5. The method of claim 1 wherein the hydrocarbon gases of step (a) are C8 to C20 hydrocarbons.

6. The method of claim 1 wherein the hydrocarbon gases are C11 to C14 hydrocarbons.

7. The method of claim 1 wherein the reforming process is a process for producing low coke naphtha.

8. The method of claim 1 wherein the reforming process produces increased ethanol blending in gasoline.

9. The method of claim 1 wherein the reforming process produces low reformate octane gasoline.

* * * * *